(12) United States Patent
Huang (10) Patent No.: US 12,169,353 B2
(45) Date of Patent: Dec. 17, 2024

(54) LENS MODULE AND PROJECTION DEVICE

(71) Applicant: Coretronic Corporation, Hsin-Chu (TW)

(72) Inventor: Shou-Cheng Huang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/900,895

(22) Filed: Sep. 1, 2022

(65) Prior Publication Data
US 2023/0061735 A1 Mar. 2, 2023

(30) Foreign Application Priority Data
Sep. 2, 2021 (CN) .......................... 202111024533.X (51) Int. Cl.
*G03B 21/14* (2006.01)
*G02B 13/16* (2006.01)
(52) U.S. Cl.
CPC ........... *G03B 21/142* (2013.01); *G02B 13/16* (2013.01)
(58) Field of Classification Search
CPC ............................... G03B 21/142; G02B 13/16
USPC ........................................................ 353/101
See application file for complete search history.

(56) References Cited

U.S. PATENT DOCUMENTS

| 3,712,725 A * | 1/1973 | Eckerdt ................... G03B 23/12 353/101 |
| 2006/0007567 A1* | 1/2006 | Sakamoto ................ G02B 7/10 359/822 |
| 2009/0002645 A1* | 1/2009 | Lee ........................... G03B 3/00 353/101 |

FOREIGN PATENT DOCUMENTS

| CN | 106324960 | 10/2018 |
| TW | 201411270 | 3/2014 |

* cited by examiner

*Primary Examiner* — Jerry L Brooks
(74) *Attorney, Agent, or Firm* — JCIPRNET (57) ABSTRACT

A lens module includes a first base, a lens assembly assembled on the first base, a second base stacked on the first base, a first adjustment member, and a second adjustment member. The first base has at least one first rib structure extending along a second axis, and at least one second rib structure extending along a first axis. The first adjustment member is movably engaged with the first rib structure along the first axis. The second adjustment member is movably engaged with the second rib structure along the second axis. When the first base moves along the first axis, the second adjustment member avoids the second rib structure. When the first base moves along the second axis, the first adjustment member avoids the first rib structure. A projection device is also provided.

10 Claims, 5 Drawing Sheets

LENS MODULE AND PROJECTION DEVICE

CROSS-REFERENCE TO RELATED APPLICATION

This application claims the priority benefit of China application no. 202111024533.X, filed on Sep. 2, 2021. The entirety of the above-mentioned patent application is hereby incorporated by reference herein and made a part of this specification.

BACKGROUND

Technical Field

The disclosure relates to a lens module and a projection device having a lens module.

Description of Related Art

In most conventional projection devices, a moving plate assembly having a single axial direction is used for driving and adjusting the position of the lens. Therefore, to allow a lens to move smoothly in a two-dimensional space, one moving plate assembly is typically used to control the horizontal movement of the lens, and another moving plate assembly is used to control the vertical movement of the lens.

Accordingly, it is apparent that the number of assembling elements and the space occupied thereby in the projection device cannot be effectively reduced. At the same time, a process of assembling the assembling elements one by one also represents gradually accumulated assembly tolerances. The accumulated tolerances tend to prevent smooth operation of the lens.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a lens module and a projection device, in which a single moving member supports and correspondingly executes driving means applied in different axial directions by a user.

Other objectives and advantages of the disclosure may be further understood from the technical features disclosed in the disclosure.

To achieve one, some, or all of the above objectives or other objectives, an embodiment of the disclosure provides a lens module adapted for a projection device. The lens module includes a first base, a lens assembly, a second base, a first adjustment member, and a second adjustment member. The first base has at least one first rib structure and at least one second rib structure. The at least one first rib structure extends along a second axis. The at least one second rib structure extends along a first axis. The first axis is perpendicular to the second axis. The lens assembly is assembled on the first base. The second base is stacked on the first base. The first adjustment member is disposed on the second base and movably engaged with the at least one first rib structure along the first axis to drive the first base to move along the first axis. The second adjustment member is disposed on the second base and movably engaged with the at least one second rib structure along the second axis to drive the first base to move along the second axis. When the first base moves along the first axis, the second adjustment member avoids the at least one second rib structure. When the first base moves along the second axis, the first adjustment member avoids the at least one first rib structure.

To achieve one, some, or all of the above objectives or other objectives, an embodiment of the disclosure provides a projection device, which includes a light source, an optical engine module, and a lens module. The light source is configured to provide an illumination light beam. The optical engine module is configured to convert the illumination light beam into an image light beam. The lens module is configured to receive the image light beam. The lens module includes a first base, a lens assembly, a second base, a first adjustment member, and a second adjustment member. The first base has at least one first rib structure and at least one second rib structure. The at least one first rib structure extends along a second axis. The at least one second rib structure extends along a first axis. The first axis is perpendicular to the second axis. The lens assembly is assembled on the first base. The second base is stacked on the first base. The first adjustment member is disposed on the second base and movably engaged with the at least one first rib structure along the first axis to drive the first base to move along the first axis. The second adjustment member is disposed on the second base and movably engaged with the at least one second rib structure along the second axis to drive the first base to move along the second axis. When the first base moves along the first axis, the second adjustment member avoids the at least one second rib structure. When the first base moves along the second axis, the first adjustment member avoids the at least one first rib structure.

Based on the foregoing, in the lens module or the projection device having a lens module, through a single moving member, namely the first base, the first adjustment member and the second adjustment member in different axial directions can be respectively coupled to the first rib structure and the second rib structure also in different axial directions on the first base. When the first base is driven by the first adjustment member to move along the first axis, the second adjustment member avoids the second rib structure. On the contrary, when the first base is driven by the second adjustment member to move along the second axis, the first adjustment member avoids the first rib structure. As such, when the user performs driving with whichever of the first adjustment member or the second adjustment member, the first base is caused to move along only a single axial direction without being affected by the other adjustment member. Accordingly, the lens module or the projection device of the disclosure can smoothly achieve simplifying members, saving space and manufacturing costs, and reducing member assembly tolerances.

Other objectives, features and advantages of the present invention will be further understood from the further technological features disclosed by the embodiments of the present invention wherein there are shown and described preferred embodiments of this invention, simply by way of illustration of modes best suited to carry out the invention.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
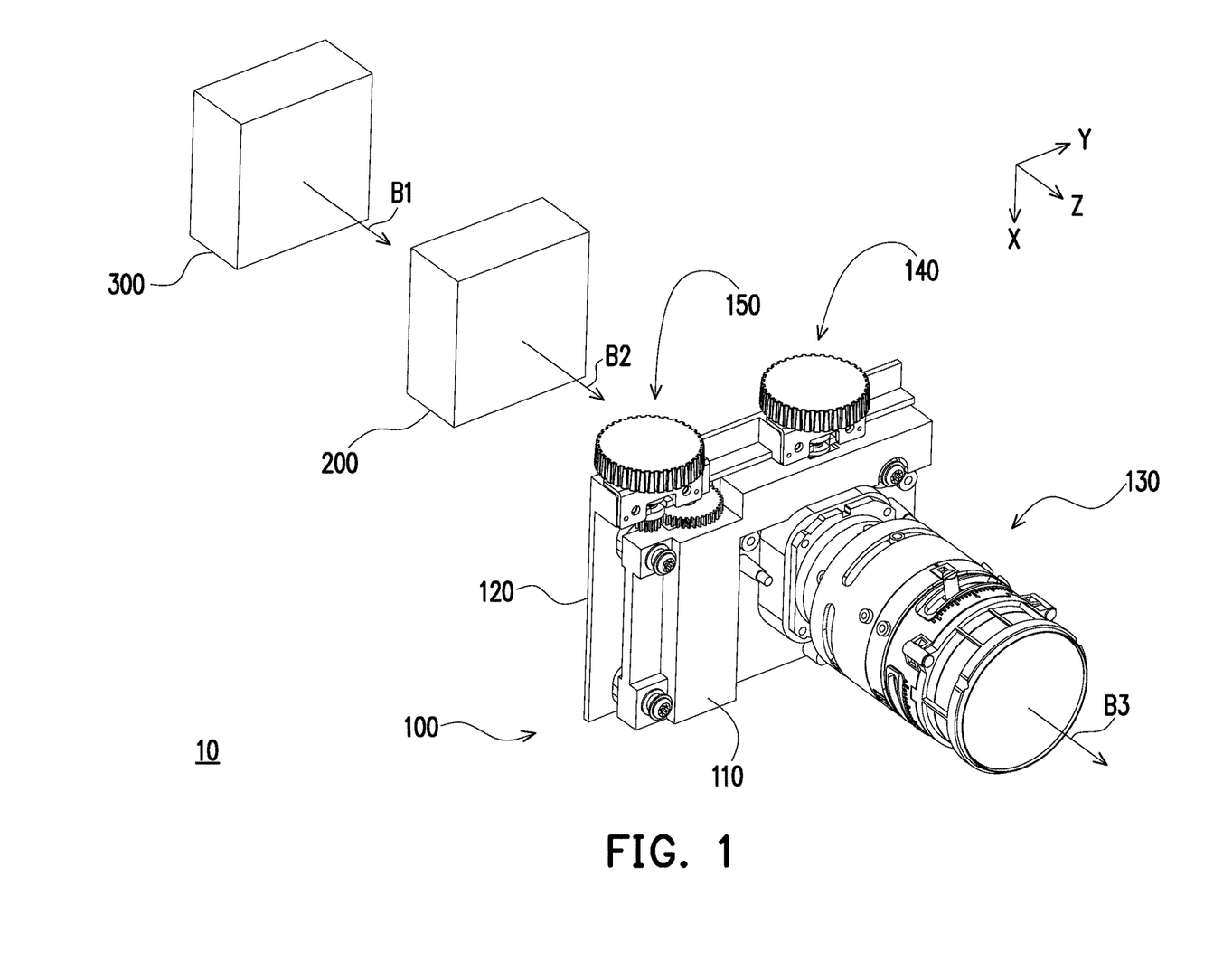
FIG. 1 is a simplified schematic diagram of a projection device according to an embodiment of the disclosure.

FIG. 1 is a simplified schematic diagram of a projection device according to an embodiment of the disclosure. With reference to FIG. 1, in this embodiment, a projection device 10 includes a light source 300, an optical engine module 200, and a lens module 100. The light source 300 is configured to provide an illumination light beam B1. The optical engine module 200 is configured to convert the illumination light beam B1 into an image light beam B2. The lens module 100 is configured to receive the image light beam B2 to form a projection light beam B3, and the lens module 100 is configured to project the projection light beam B3 out of the projection device 10. In this embodiment, a rectangular coordinate system X-Y-Z is also provided to facilitate the following description of members.

Figure 2:
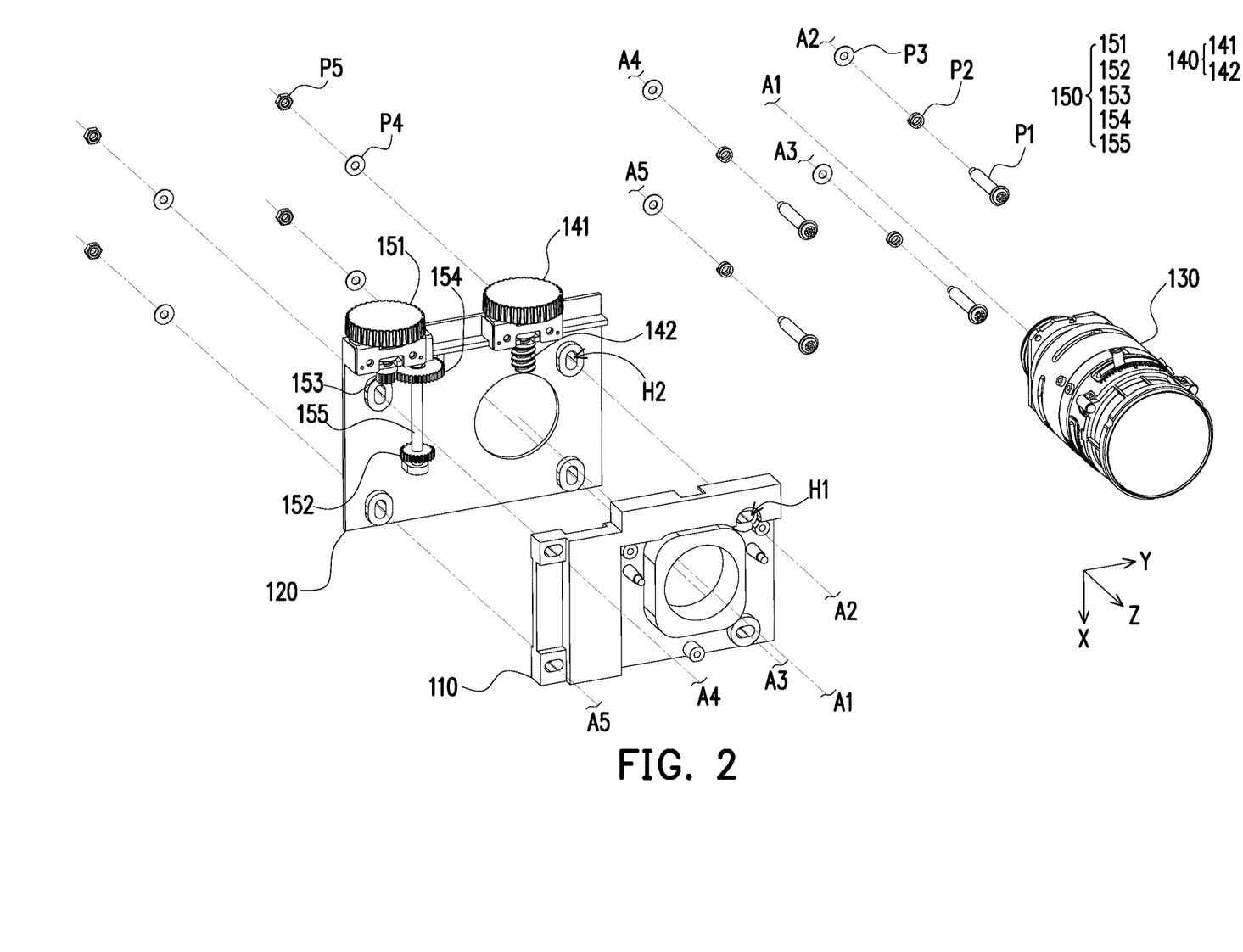
FIG. 2 is an exploded view of the lens module of FIG. 1.
Figure 3:
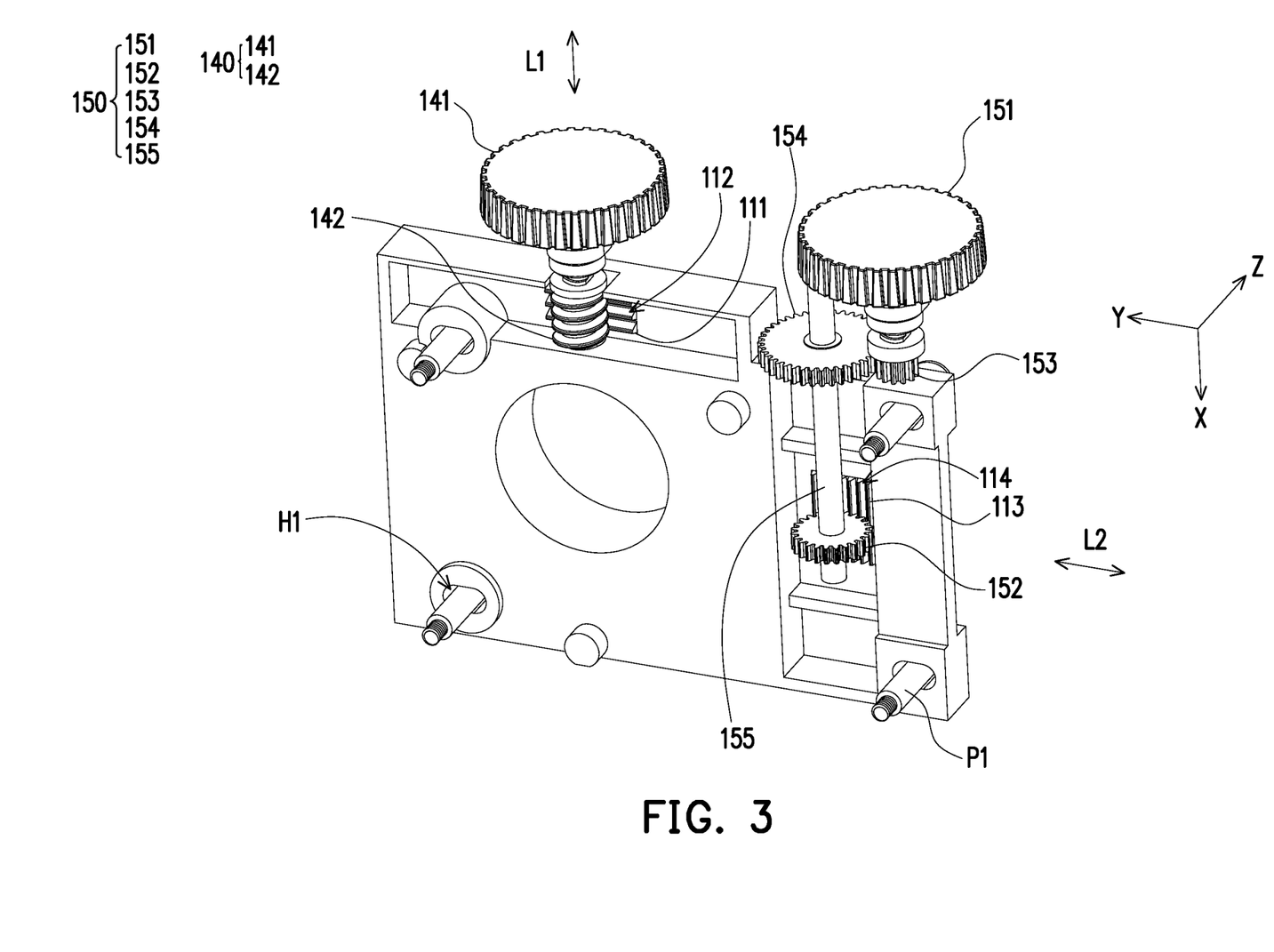
FIG. 3 shows some members of the lens module of FIG. 1 from another perspective.

Moreover, the lens module 100 includes a first base 110, a lens assembly 130, a second base 120, a first adjustment member 140, and a second adjustment member 150. FIG. 2 is an exploded view of the lens module of FIG. 1. FIG. 3 shows some members of the lens module of FIG. 1 from another perspective, and omits the second base 120 and a connecting member configured to assemble the first adjustment member 140 and the second adjustment member 150 on the second base 120, so that the corresponding relationship of the first adjustment member 140 and the second adjustment member 150 to the first base 110 can be clearly identified. With reference to FIG. 2 and FIG. 3 together, the first base 110 of this embodiment has at least one first rib structure 111 (here, a plurality of first rib structures 111 are taken as an example, the plurality of the first rid structure 111 arranged along a first axis L1) and at least one second rib structure 113 (here, a plurality of second rib structures 113 are taken as an example, the plurality of second rib structures 113 arranged along a second axis L2). The first rib structure 111 extends along the second axis L2, the second rib structure 113 extends along the first axis L1, and the first axis L1 is perpendicular to the second axis L2. In this embodiment, the first axis L1 is substantially the X axis or parallel to the X axis, and the second axis L2 is substantially the Y axis or parallel to the Y axis.

In addition, relevant assemblies in FIG. 2 are labeled with reference numerals (assembling lines A1 to A5) to facilitate identifying the assembly relationship between the members. That is, the same reference numeral denote the same assembling line. In this embodiment, the lens assembly 130 is assembled on the first base 110 and is partially disposed through in the second base 120. The second base 120 is stacked on the first base 110. The first adjustment member 140 and the second adjustment member 150 are each pivotally disposed on the second base 120. The first adjustment member 140 is movably engaged with the first rib structure 111 (along the first axis L1) to drive the first base 110 to move along the first axis L1. The second adjustment member 150 is movably engaged with the second rib structure 113 (along the second axis L2 to drive the first base 110 to move along the second axis L2. From the corresponding configuration of the first adjustment member 140, the second adjustment member 150, the first rib structure 111, and the second rib structure 113, it is apparent that when the first base 110 moves along the first axis L1, the second adjustment member 150 avoids (without interfere) the second rib structure 113, and when the first base 110 moves along the second axis L2, the first adjustment member 140 avoids the first rib structure 111.

Further, the first adjustment member 140 of this embodiment includes a first knob 141 and a threaded element 142. The threaded element 142 is, for example, a screw rod. In addition, the rotation axis of the first knob 141 and the rotation axis of the threaded element 142 are coaxial with each other, that is, are both located on the first axis L1. Therefore, when a user drives the first knob 141 to rotate the threaded element 142 around the first axis L1, the user can smoothly drive the first base 110 to move along the first axis L1. The second adjustment member 150 includes a second knob 151 and a gear element 152. The gear element 152 is, for example, a spur gear, and the rotation axis of the gear element 152 is parallel to the first axis L1. The rotation axis of the second knob 151 is also parallel to the first axis L1.

Moreover, the rotation axis of the gear element 152 and the rotation axis of the second knob 151 are different from each other.

The second adjustment member 150 also includes actuating gears 153, 154 and an actuating shaft 155. The actuating gear 153 is coaxially connected to second knob 151. The gear element 152 and the actuating gear 154 are coaxially disposed on opposite ends of the actuating shaft 155. Moreover, the actuating gears 153, 154 are engaged with each other. Accordingly, the rotation of the second knob 151 can be transmitted through the actuating gears 153, 154 and the actuating shaft 155 to the gear element 152. Therefore, when the user drives the second knob 151 to rotate, the user can cause the gear element 152 to smoothly drive the first base 110 to move along the second axis L2 through the second rib structure 113.

Here, the form and configuration of the actuating gears 153, 154 or the actuating shaft 155 are not limited. Any conventional art, based on which the rotational movement of the second knob 151 can be smoothly transmitted to the gear element 152 and the first base 110 can be accordingly driven to move along the second axis L2, may be appropriately applied to this embodiment. In the meantime, in another embodiment not shown, the gear element may also be coaxially connected to the second knob 151.

Briefly speaking, in this embodiment, the first rib structures 111 are adjacently disposed to form a plurality of first rib grooves 112 (i.e., the plurality of first rib grooves 112 are defined by the first rib structures 111), and the second rib structures 113 are adjacently disposed to form a plurality of second rib grooves 114. Therefore, when the first base 110 moves along the first axis L1, it is equivalent that the second adjustment member 150 moves along the second rib grooves 114 with its protruding tooth structure (for example, the tooth of the gear element 152) without interfering with each other. On the contrary, when the first base 110 moves along the second axis L2, it is equivalent that the first adjustment member 140 moves along the first rib grooves 112 with its protruding tooth structure (for example, the thread of threaded element 142) without interfering with each other.

In addition, with further reference to FIG. 2, the first base 110 has at least one first expanded hole H1 (here, four first expanded holes H1 are taken as an example), and the second base 120 has at least one second expanded hole H2 (here, four second expanded holes H2 are taken as an example). In this embodiment, the at least one first expanded hole H1 and the at least one second expanded hole H2 are through holes. A width of the first expanded hole H1 in a direction parallel to an expansion axial direction is greater than a width of the first expanded hole H1 in a direction perpendicular to the expansion axial direction. Moreover, the lens module 100 also includes at least one locking member P1 (here, four locking members P1 are taken as an example), and the locking member P1 is disposed through the first expanded hole H1 and the second expanded hole H2 corresponding to each other, and the first base 110 bears movably against the second base 120. The expansion axial direction (along the second axis L2, or may be regarded as along the Y axis) of the first expanded hole H1 is perpendicular to the expansion axial direction (along the first axis L1, or may be regarded as the X axis) of the second expanded hole H2. When the first base 110 moves along the first axis L1 or the second axis L2, the locking member P1 interferes with one of the first expanded hole H1 and the second expanded hole H2 and moves along the other of the first expanded hole H1 and the second expanded hole H2. Accordingly, with the different expansion axial directions of the first expanded hole H1 and the second expanded hole H2, the first base 110 and the second base 120 not only fulfill the guiding requirement along the first axis L1 or the second axis L2 but also generate movement restriction on the other axis.

In addition, as shown in FIG. 2, the locking member P1 first passes through an elastic member P2 (e.g., a compression spring) and a gasket P3, subsequently passes through the first base 110 and the second base 120, and then passes through a gasket P4 to be finally locked with a nut P5. Briefly speaking, the locking member P1, the elastic member P2, and the gaskets P3, P4 form a spring screw structure. The spring screw structure (for example, the locking member P1) is in contact with at least one inner side surface of the first expanded hole H1 and the second expanded hole H2 in the expansion axial directions of the first expanded hole H1 and the second expanded hole H2. For example, a width of the locking member P1 is equal to or slight less than a width of the first expanded hole H1 in a direction parallel to the first axis L1, and a width of the locking member P1 is equal to or slight less than a width of the second expanded hole H2 in a direction parallel to the second axis L2. The gaskets P3 and P4 has a material including Teflon, metal, or both, to adjust the compression of the elastic member P2 together with the locking stroke of the nut P5 and the locking member P1, accordingly providing the friction required when the first base 110 and the second base 120 move relative to each other.

Figure 4:
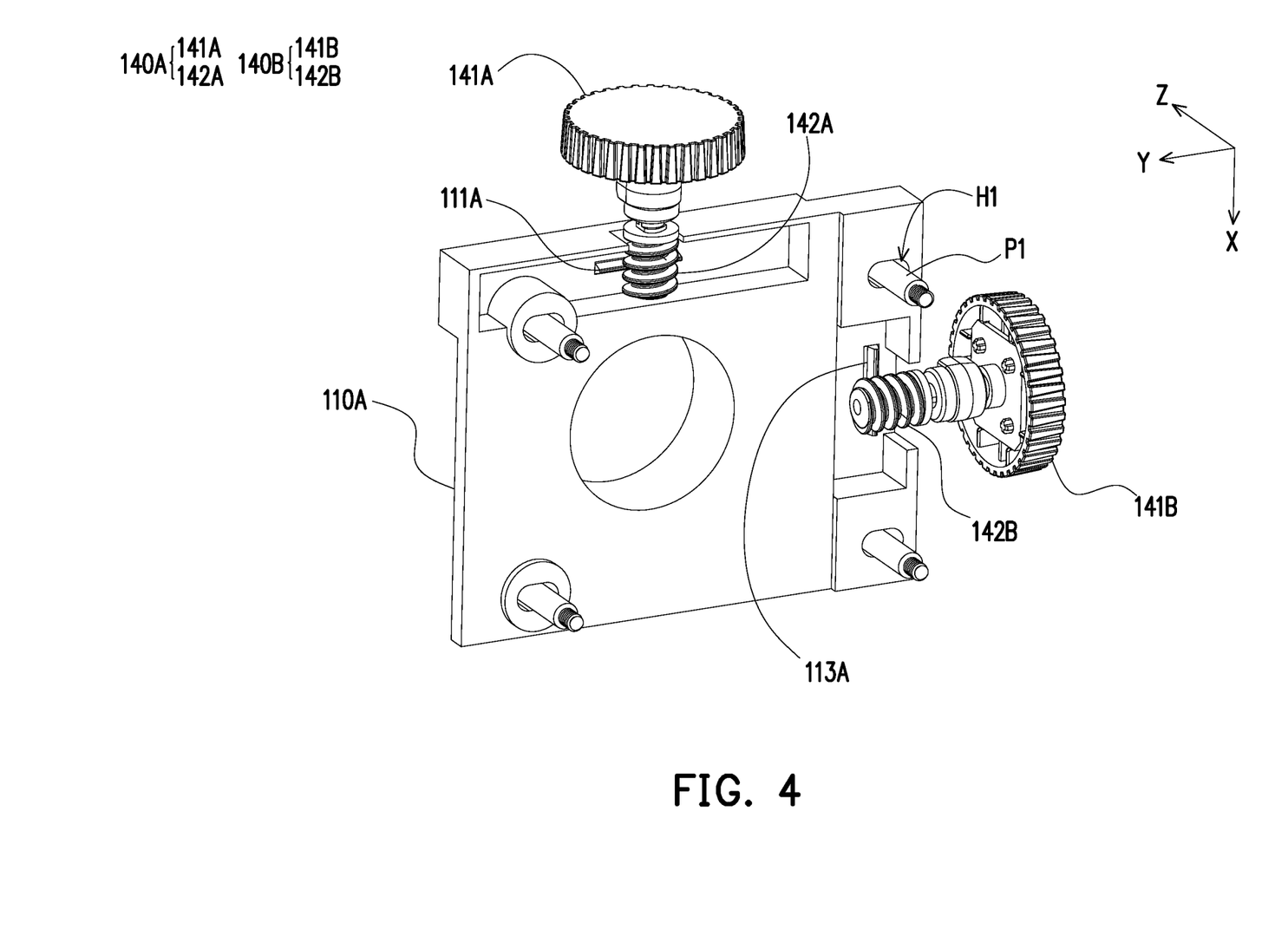
FIG. 4 is a schematic diagram of some members of a lens module according to another embodiment of the disclosure.

FIG. 4 is a schematic diagram of some members of a lens module according to another embodiment of the disclosure. With reference to FIG. 4, in the lens module of this embodiment, a first adjustment member 140A includes a first knob 141A and a threaded element 142A, and is similar to the first adjustment member 140 of the above embodiment as a member configured to drive a first base 110A to move along the X axis (equivalent to the first axis L1). A second adjustment member 140B is configured to drive the first base 110A to move along the Y axis (equivalent to the second axis L2). The second adjustment member 140B includes a second knob 141B and a threaded element 142B, and apparently has the same composition of members with the first adjustment member 140A. In addition, accompanied with the adjustment member structure having the threaded elements, only one member is required for each of a first rib structure 111A and a second rib structure 113A disposed on the first base 110A to smoothly achieve the driving.

Figure 5:
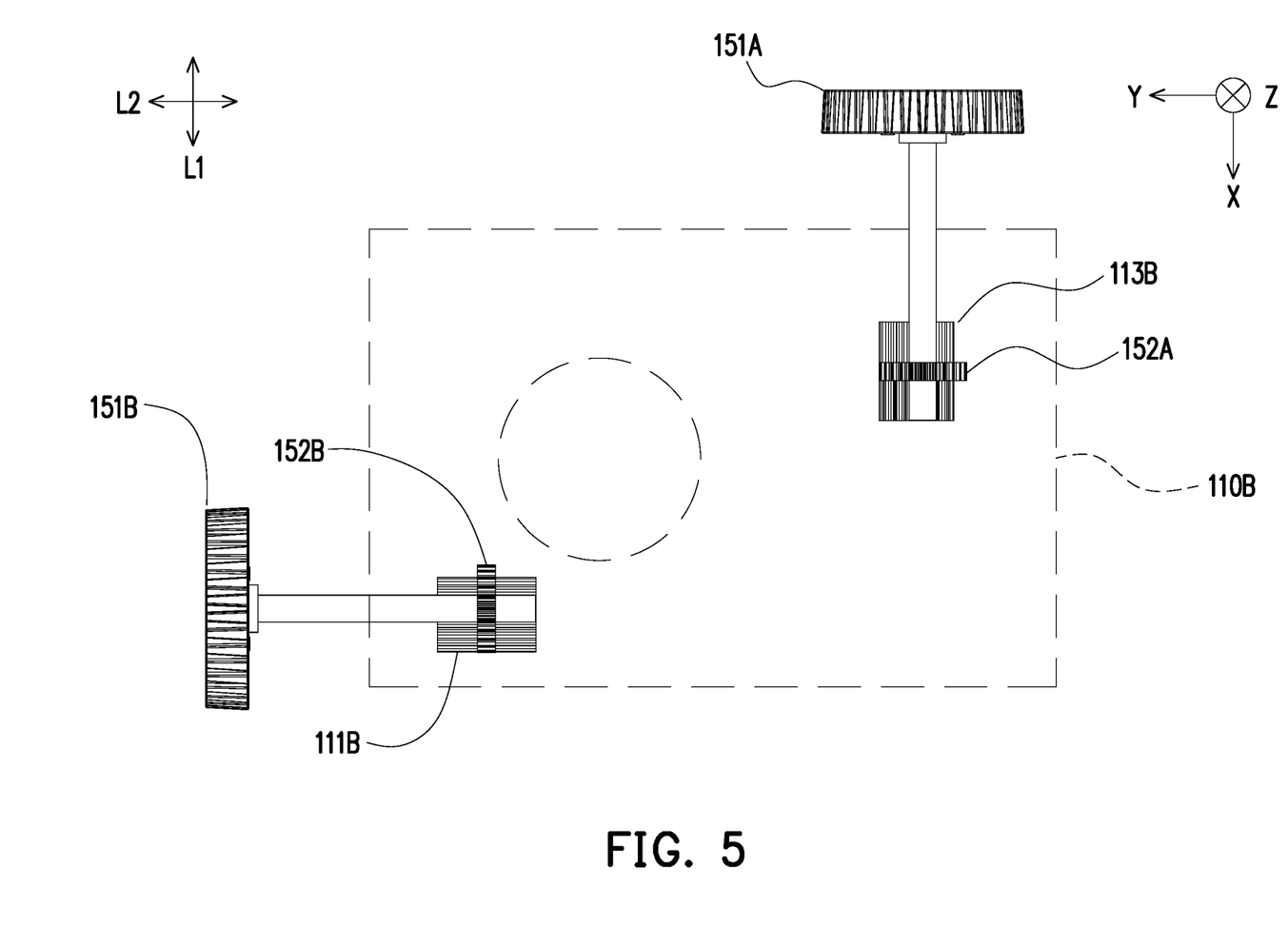
FIG. 5 is a simplified schematic diagram of a lens module according to another embodiment of the disclosure.

FIG. 5 is a simplified schematic diagram of a lens module according to another embodiment of the disclosure. With reference to FIG. 5, in this embodiment, the first adjustment member of the lens module includes a first knob 151B and a gear element 152B, and is configured to drive a first base 110B to move along the X axis (equivalent to the first axis L1). The second adjustment member includes a second knob 151A and a gear element 152A, and is configured to drive the first base 110B to move along the Y axis (equivalent to the second axis L2). As can be clearly seen from this embodiment, the first adjustment member and the second adjustment member have the same composition of members, and the gear elements 152A and 152B are both spur gears. Therefore, it is required to correspondingly dispose a plurality of first rib structures 111B and a plurality of second rib structures 113B on the first base 110B.

As also can be seen from the above embodiment, when the first adjustment member and the second adjustment member adopt the same driving member, for example, both are threaded elements or both are gear elements as shown in FIG. 4 and FIG. 5, then the first adjustment member and the second adjustment member require to be located on different side edges of the first base (second base) to respectively correspond to the first axis and the second axis. Moreover, when the driving components adopted are different, for example, when one is a threaded element and the other is a gear element as shown in FIG. 1 to FIG. 3, then the first adjustment member and the second adjustment member require to be located on the same side edge of the first base (second base). The designer may adopt the required composition of adjustment members depending on requirements.

In summary of the foregoing, in the lens module or the projection device having a lens module described in the above embodiments of the disclosure mentioned above, through a single moving member, namely the first base, the first adjustment member and the second adjustment member in different axial directions can be respectively coupled to the first rib structure and the second rib structure also in different axial directions on the first base. When the first base is driven by the first adjustment member to move along the first axis, the second adjustment member avoids the second rib structure. On the contrary, when the first base is driven by the second adjustment member to move along the second axis, the first adjustment member avoids the first rib structure.

As also can be seen from the above embodiments, the adjustment member may be formed of a gear element, such as a spur gear, and a knob to work with the plurality of rib structures, and may also be formed of a threaded element, such as a screw, and a knob to work with the at least one rib structure. In the meantime, it is only necessary that the adjustment member in the required form works with its relative position corresponding to the first base and the second base, then the first base is smoothly capable of moving in different axial directions.

As such, when the user performs driving with whichever of the first adjustment member or the second adjustment member, the first base is caused to move along only a single axial direction without being affected by the other adjustment member. Accordingly, the lens module or the projection device of the disclosure can smoothly achieve simplifying members, saving space and manufacturing costs, and reducing member assembly tolerances.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Apparently, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lens module adapted for a projection device, the lens module comprising:
   a first base having at least one first rib structure and at least one second rib structurez wherein the at least one first rib structure extends along a direction parallel to a second axis, the at least one second rib structure extends along a direction parallel to a first axis, and the first axis is perpendicular to the second axis, wherein the first base has at least one first expanded hole;
   a lens assembly assembled on the first base;
   a second base stacked on the first base, wherein the second base has at least one second expanded hole;
   a first adjustment member disposed on the second base and movably engaged with the at least one first rib structure to drive the first base to move along the first axis;
   a second adjustment member disposed on the second base and movably engaged with the at least one second rib structure to drive the first base to move along the second axis; and
   at least one locking member disposed through the at least one first expanded hole and the at least one second expanded hole corresponding to each other, wherein the first base bears movably against the second base, and an expansion axial direction of the at least one first expanded hole is perpendicular to an expansion axial direction of the at least one second expanded hole,
   wherein when the first base moves along the first axis, the second adjustment member avoids the at least one second rib structure, and when the first base moves along the second axis, the first adjustment member avoids the at least one first rib structure.

2. The lens module according to claim 1, wherein the first adjustment member comprises a threaded element and a first knob taking the first axis as a rotation axis.

3. The lens module according to claim 1, wherein the second adjustment member comprises a threaded element and a second knob taking the second axis as a rotation axis.

4. The lens module according to claim 1, wherein the at least one first rib structure comprises a plurality of first rib structures parallel to the second axis, and the plurality of first rib structures form a plurality of first rib grooves, wherein the plurality of first rib structures are arranged along the first axis.

5. The lens module according to claim 1, wherein the at least one second rib structure comprises a plurality of second rib structures parallel to the first axis, and the plurality of second rib structures form a plurality of second rib grooves, wherein the plurality of second rib structures are arranged along the second axis.

6. The lens module according to claim 1, wherein when the first base moves along the first axis or along the second axis, the locking member interferes with one of the first expanded hole and the second expanded hole, and moves along the other of the first expanded hole and the second expanded hole.

7. The lens module according to claim 6, wherein the expansion axial direction of the first expanded hole is parallel to the first axis or the second axis, and the expansion axial direction of the second expanded hole is parallel to the second axis or the first axis.

8. A projection device, comprising:
a light source configured to provide an illumination light beam;
an optical engine module configured to convert the illumination light beam into an image light beam; and
a lens module configured to receive the image light beam, and comprising:
a first base having at least one first rib structure and at least one second rib structure, wherein the at least one first rib structure extends along a direction parallel to a second axis, the at least one second rib structure extends along a direction parallel to a first axis, and the first axis is perpendicular to the second axis, wherein the first base has at least one first expanded hole;
a lens assembly assembled on the first base;
a second base stacked on the first base, wherein the second base has at least one second expanded hole;
a first adjustment member disposed on the second base and movably engaged with the at least one first rib structure todrive the first base to move along the first axis;
a second adjustment member disposed on the second base and movably engaged with the at least one second rib structure to drive the first base to move along the second axis; and
at least one locking member disposed through the at least one first expanded hole and the at least one second expanded hole corresponding to each other, wherein the first base bears movably against the second base, and an expansion axial direction of the at least one first expanded hole is perpendicular to an expansion axial direction of the at least one second expanded hole,
wherein when the first base moves along the first axis, the second adjustment member avoids the at least one second rib structure, and when the first base moves along the second axis, the first adjustment member avoids the at least one first rib structure.

9. A lens module adapted for a projection device, the lens module comprising:

a first base having at least one first rib structure and at least one second rib structure, wherein the at least one first rib structure extends along a direction parallel to a second axis, the at least one second rib structure extends along a direction parallel to a first axis, and the first axis is perpendicular to the second axis;
a lens assembly assembled on the first base;
a second base stacked on the first base;
a first adjustment member disposed on the second base and movably engaged with the at least one first rib structure to drive the first base to move along the first axis, wherein the first adjustment member comprises a gear element and a first knob taking the second axis as a rotation axis, and the first knob is disposed along the second axis, or the rotation axis of the first knob is parallel to the second axis; and
a second adjustment member disposed on the second base and movably engaged with the at least one second rib structure to drive the first base to move along the second axis,
wherein when the first base moves along the first axis, the second adjustment member avoids the at least one second rib structure, and when the first base moves along the second axis, the first adjustment member avoids the at least one first rib structure.

10. A lens module adapted for a projection device, the lens module comprising:
a first base having at least one first rib structure and at least one second rib structure, wherein the at least one first rib structure extends along a direction parallel to a second axis, the at least one second rib structure extends along a direction parallel to a first axis, and the first axis is perpendicular to the second axis;
a lens assembly assembled on the first base;
a second base stacked on the first base;
a first adjustment member disposed on the second base and movably engaged with the at least one first rib structure to drive the first base to move along the first axis; and
a second adjustment member disposed on the second base and movably engaged with the at least one second rib structure to drive the first base to move along the second axis, wherein the second adjustment member comprises a gear element and a second knob taking the first axis as a rotation axis, and the second knob is disposed along the first axis, or the rotation axis of the second knob is parallel to the first axis,
wherein when the first base moves along the first axis, the second adjustment member avoids the at least one second rib structure, and when the first base moves along the second axis, the first adjustment member avoids the at least one first rib structure.

* * * * *

UNITED STATES PATENT AND TRADEMARK OFFICE
CERTIFICATE OF CORRECTION

PATENT NO. : 12,169,353 B2
APPLICATION NO. : 17/900895
DATED : December 17, 2024
INVENTOR(S) : Shou-Cheng Huang Page 1 of 1

It is certified that error appears in the above-identified patent and that said Letters Patent is hereby corrected as shown below:

In the Claims

At Column 9, Line 34, Claim 8, change "todrive" to --to drive--:

Signed and Sealed this
Eighteenth Day of March, 2025

Coke Morgan Stewart
*Acting Director of the United States Patent and Trademark Office*